US00RE39610E

(19) United States
(12) Reissued Patent
McFarland

(10) Patent Number: US RE39,610 E
(45) Date of Reissued Patent: May 1, 2007

(54) SYSTEMS AND METHODS FOR REPLACING OPEN WINDOWS IN A GRAPHICAL USER INTERFACE

(75) Inventor: Max McFarland, Sunnyvale, CA (US)

(73) Assignee: Apple Computer Inc., Cupertino, CA (US)

(21) Appl. No.: 10/165,040

(22) Filed: Jun. 6, 2002

Related U.S. Patent Documents

Reissue of:
(64) Patent No.: 6,072,488
Issued: Jun. 6, 2000
Appl. No.: 08/435,375
Filed: May 5, 1995

(51) Int. Cl.
*G06F 3/00* (2006.01)
*G06F 9/00* (2006.01)
*G06F 17/00* (2006.01)

(52) U.S. Cl. ..... 715/794; 715/790; 715/807
(58) Field of Classification Search ..... 715/790–797, 715/802, 806, 807, 783, 788
See application file for complete search history.

(56) References Cited

U.S. PATENT DOCUMENTS 4,819,189 A 4/1989 Kikuchi et al.
4,862,389 A 8/1989 Takagi
4,954,818 A 9/1990 Nakane et al.
5,075,675 A * 12/1991 Barker et al. ..... 715/794
5,305,435 A * 4/1994 Bronson ..... 715/777
5,333,255 A 7/1994 Damouth
5,377,317 A 12/1994 Bates et al.
5,412,775 A * 5/1995 Maeda et al. ..... 715/797
5,412,776 A 5/1995 Bloomfield et al.
5,479,497 A 12/1995 Kovarik
5,604,861 A * 2/1997 Douglas et al. ..... 715/776
5,664,128 A * 9/1997 Bauer ..... 715/708
5,956,030 A * 9/1999 Conrad et al. ..... 715/769

* cited by examiner

*Primary Examiner*—Ba Huynh
(74) *Attorney, Agent, or Firm*—Fenwick & West LLP

(57) ABSTRACT

Systems and methods for returning windows to an original location are described. When springing already open windows to a new location on a display space, it is desired to return that window to its original location for certain situations. A list is provided when the springing operation is initialized which captures information used to return the sprung window. According to exemplary embodiments, the relocation of various windows is tracked to ensure that each window is returned to an original location.

55 Claims, 6 Drawing Sheets

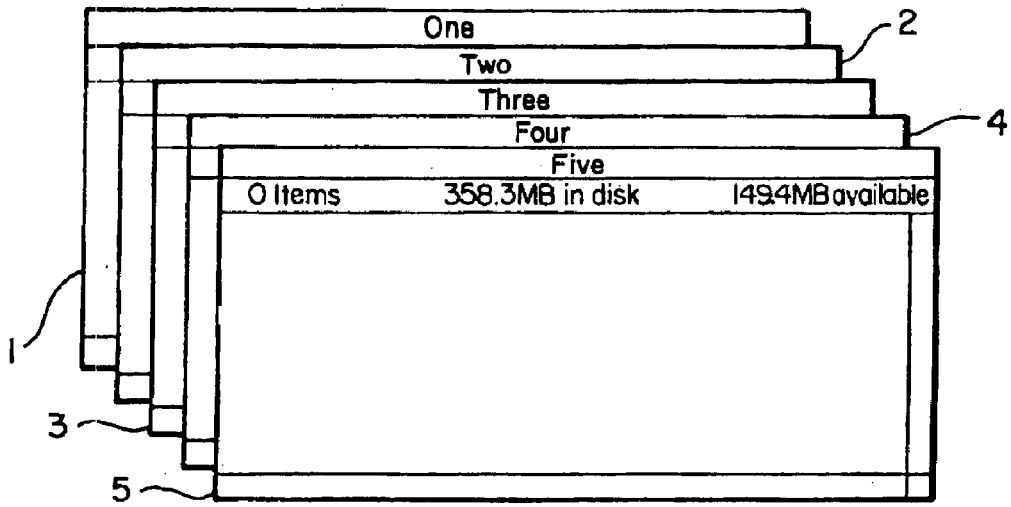
FIG_2 (Prior Art)
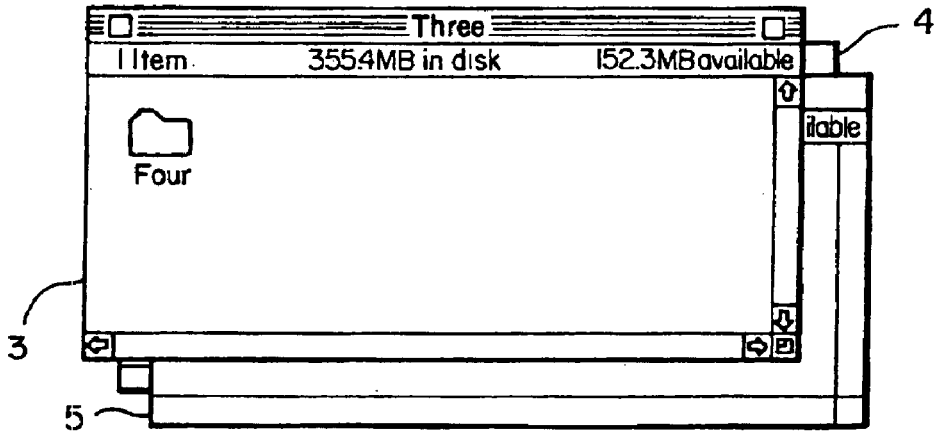
FIG_4 (Prior Art)
| Window ID | Location Indicator |
|---|---|
| 5 | N |
| 4 | N |
| 3 | N |
| 2 | N |
| 1 | N |
FIG_6

SYSTEMS AND METHODS FOR REPLACING OPEN WINDOWS IN A GRAPHICAL USER INTERFACE

Matter enclosed in heavy brackets [ ] appears in the original patent but forms no part of this reissue specification; matter printed in italics indicates the additions made by reissue.

BACKGROUND

The present invention relates generally to graphical user interfaces for computer systems. More particularly, the present invention relates to methods and systems for replacing open windows which have been sprung to a new display location as controlled by graphical user interfaces.

The evolution of the computer industry is arguably unparalleled in its rate of growth and complexity. Personal computers, for example, which began as little more than feeble calculators with limited memory, tape-driven input and monochrome displays are now able to tackle almost any data processing task. While this meteoric increase in power was almost sufficient to satisfy the demand of application programmers and end users alike, the corresponding increase in complexity created an ease-of-use problem which the industry was somewhat slower in solving. Thus, designers were faced with a new challenge: to harness this computing power in a form usable by even those with relatively little computer training to smooth the transition of other industries into a computer-based information paradigm.

As a result, in the early to mid-1980's many new I/O philosophies, such as "user friendly", "WYSIWYG" and "menu driven" came to the forefront of the industry. These concepts are particularly applicable to microcomputers, also known as personal computers, which are intended to appeal to a broad audience of computer users, including those who previously feared and mistrusted computers. An important aspect of computers which employ these concepts was, and continues to be, the interface which allows the user to input commands and data and receive results, which is commonly referred to as a graphical user interface (GUI).

One type of GUI is based on a visual metaphor which uses a monitor screen as a work surface called a "desktop" where documents are presented in relocatable regions termed "windows". The user interacts with the computer by, for example, moving objects on the desktop, choosing commands from menus, and manipulating window controls, such as checkboxes and scroll bars. An exemplary desktop screen is reproduced as FIG. 1.

The success of this type of interface is evident from the number of companies which have emulated the desktop environment. Even successful concepts, however, must continually be improved in order to keep pace with the rapid growth in this industry. The advent of multimedia, especially CD-ROM devices, has provided vast quantities of secondary storage which have been used to provide video capabilities, e.g., live animation and video clips, as regular components of application displays. With these new resources at their disposal, application designers, and others, desire more and more control over the appearance of the display, including the desktop environment and, in particular, objects on the desktop.

Windows, filing cabinets, folders and documents are several examples of conventional desktop objects which extend the desktop visual metaphor. Folder windows can be configured to "spring" open when a user holds an item over a container item (e.g., a disk, folder, catalog, mailbox, viewer, server, or trash icon) which has one or more folders therein. Folder windows that are sprung open are temporarily centered under the cursor or as close to this centered position as possible while remaining on one monitor.

Occasionally, the folder windows which are sprung open by the user's actions relative to a container object are already open elsewhere on the desktop. Consider, for example, that a folder entitled "Five" is embedded in a hierarchical tree of folders such that folder "One" holds folder "Two" which holds folder "Three" which holds folder "Four" which holds folder "Five". That is, to open folder "Five", a user would open folders One, Two, Three, Four and Five in that order. This could result, for example, in the cascaded series of open folder windows shown in FIG. 2. Note that these folder windows are numbered 1,2,3, 4 and 5, respectively, for ease of reference in this text and that the folders and their respective folder windows will both be referred to using the same numbers.

Now suppose that a user springs open a container which happens to include folder 3 therein. As mentioned above, folder windows which are sprung open are drawn centered at the cursor location, if possible. Thus, folder window 3 will be closed at its location in the display space between the cascaded folder windows 2 and 4 and redrawn at a location centered on the cursor. This example is illustrated in FIG. 3. Note that the folder windows 1, 2, 4, and 5 are opened in a first portion 10 of the display space 12, but folder window 3 has been sprung open at a second portion 14 of the display space 12 centered about a cursor (not shown). A gap is left between windows 2 and 4 in the position vacated by folder window 3.

When the user releases the mouse button, or otherwise completes the drag, only the destination folder and folders that were open before the drag operation began remain open, e.g., folders 1–5 in this example. If folder 3 is not the destination folder, then this window would close at its displayed location in portion 14 of display space 23. Conventionally, folder window 3 would then be redrawn on top of folder window 5 in portion 10 of the display space 12 as seen in FIG. 4. However, this is considered to be undesirable since folder 3 now appears out of order with respect to folders 1, 2, 4 and 5 and blocks the view of the title bars of the other folder windows.

SUMMARY

These and other problems and drawbacks of conventional systems and methods for replacing windows in graphical user interfaces are overcome according to the present invention. According to exemplary embodiments, open windows which are sprung to a new location on the display space are returned to their original location when the springing operation is concluded. A list or other data structure is created when a springing operation is initiated that identifies open windows on the desktop, their relationship to other windows in their original positions, and an indicator that tracks the status of these windows as sprung or unsprung. When the springing operation is concluded, sprung windows can be returned to their original position using the information found in the list or data structure which was created when the springing operation commenced.

BRIEF DESCRIPTION OF THE DRAWINGS

The foregoing, and other, objects, features and advantages of the present invention will be more readily understood by those skilled in the art upon reading the following detailed description in conjunction with the drawings in which:

FIG. 2 illustrates an exemplary set of cascaded open windows used to describe exemplary embodiments of the present invention;

FIG. 4 depicts the result of a conventional technique for returning the sprung window of FIG. 3;

FIG. 6 illustrates an exemplary data structure used to capture open window information according to an exemplary embodiment of the present invention;

DETAILED DESCRIPTION

Figure 1:
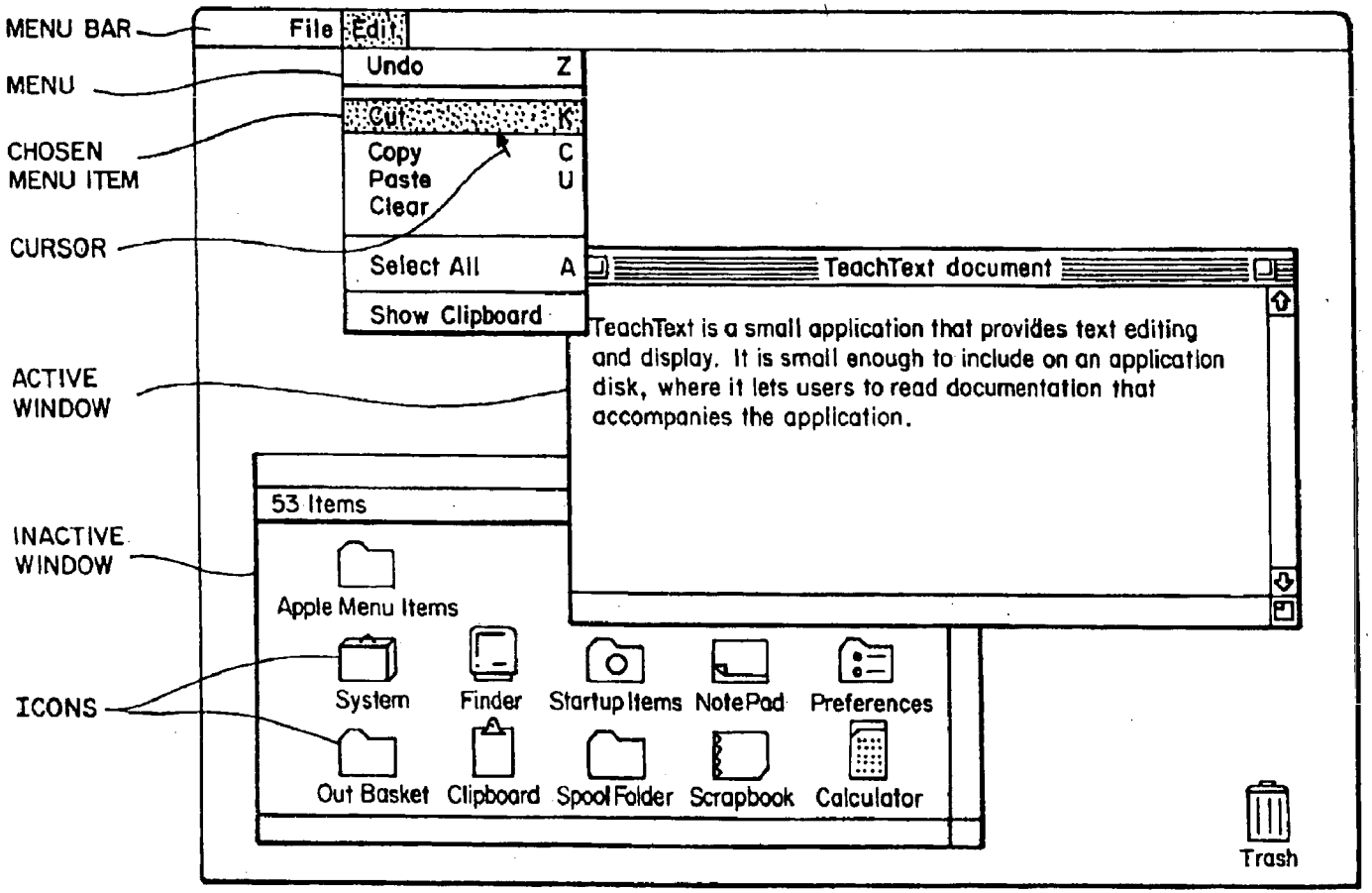
FIG 1 (Prior Art)
FIG. 1 shows a conventional desktop screen.

Exemplary embodiments of the present invention will be described in terms of various visual aspects created or drawn in a display space controlled by a graphical user interface. Those skilled in the art will appreciate that such an interface can, for example, be used in conjunction with a computer such as that illustrated in FIG. 5(a). Therein, a personal computer is illustrated as having a box 16 which contains, among other elements, circuit boards associated with the computer's functions, a keyboard 18, a pointing device 20 and a monitor 22 having a display space 24. The circuit boards included in box 16 can include boards which accommodate functional units such as those illustrated by the block diagram of FIG. 5(b). Therein RAM 30, ROM 32, processor 34, and I/O 36 are all interconnected via system bus 38.

Figure 5A:
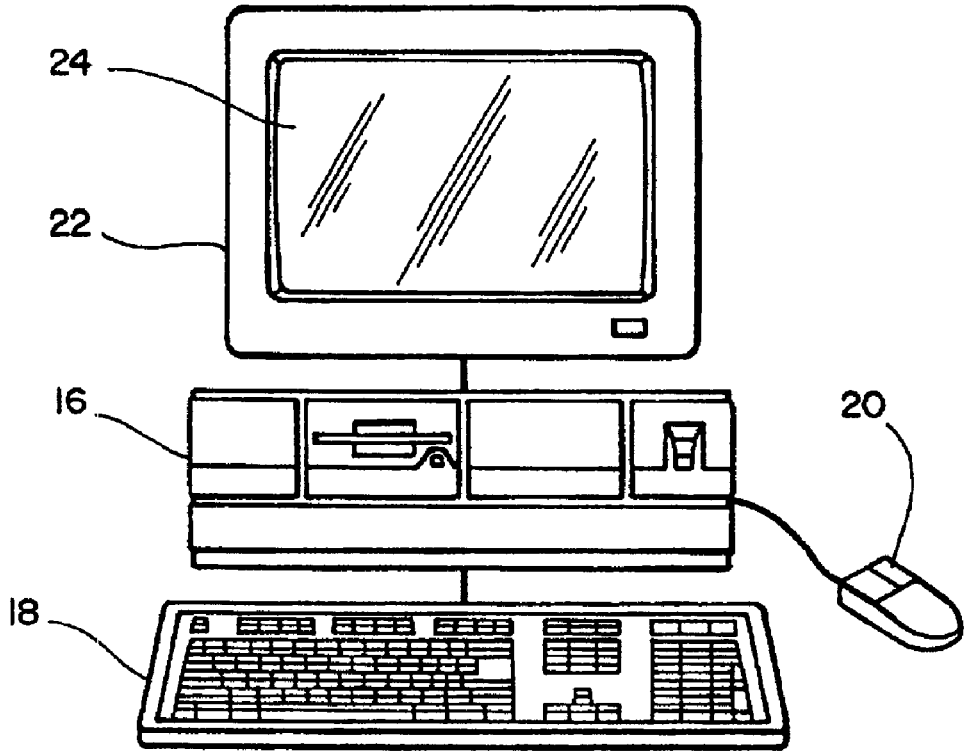
FIG. 5(a) is a block diagram of an exemplary computer system which can be used to implement the present invention.
Figure 5B:
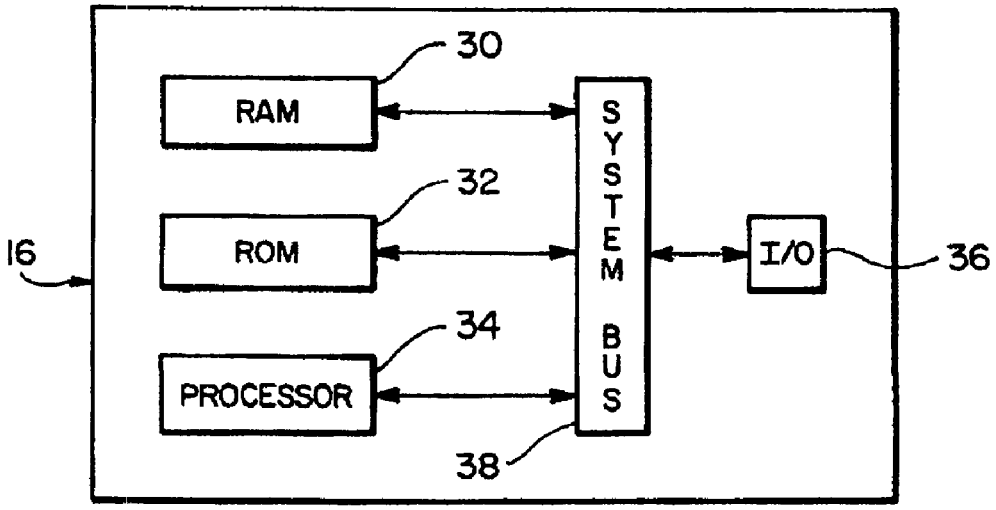
FIG. 5(b) is a block diagram illustrating various exemplary functional units of the computer system of FIG. 5(a)

Of course the personal computer illustrated in FIGS. 5(a) and 5(b) is purely exemplary of one type of computer system in which graphical user interfaces according to the present invention may be implemented. For example, although the display space 24 of the system depicted in FIG. 5(a) consists of that provided by monitor 22, those skilled in the art will recognize that additional display devices could be arranged proximate monitor 22 to create a display space bridging several monitors. Moreover, although the present invention is described herein by way of exemplary, illustrative embodiments, some of which refer to graphical user interfaces implemented using the Macintosh® computer system as a reference for explaining the present invention, those those skilled in the art will readily appreciate that systems and methods according to the present invention can be applied to any type of display system having a user interface. Those wishing additional information with respect to the Macintosh® system are referred to Inside Macintosh, Vols. 1–6.

Figure 7:
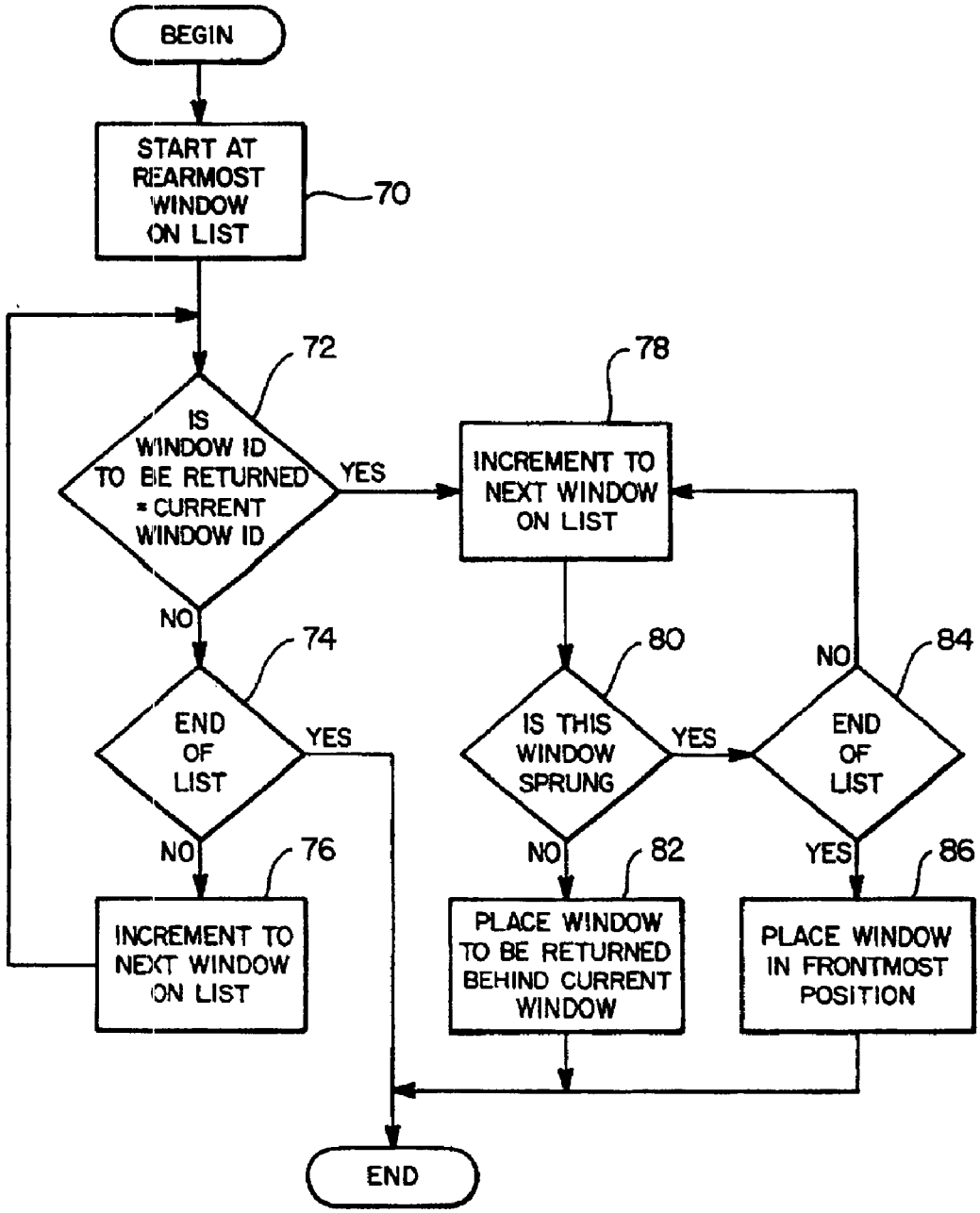
FIG. 7 is a flowchart describing a technique for returning the sprung window of FIG. 3 back to its original position as seen in FIG. 2 according to an exemplary embodiment of the present invention.

Returning now to the discussion of spring loaded folders, according to exemplary embodiments of the present invention windows which were open at the beginning of a springing operation be returned to their original location at the end of the operation. In terms of the foregoing example, window folder 3 will be returned to its original position relative to folders 1, 2, 4 and 5 (as shown in FIG. 2) in the portion 10 of the display space 12 rather than returning to portion 10 of the display space 12 as the front window (as shown in FIG. 4). Exemplary techniques for accomplishing this result will now be described with respect to FIGS. 6 and 7.

Figure 3:
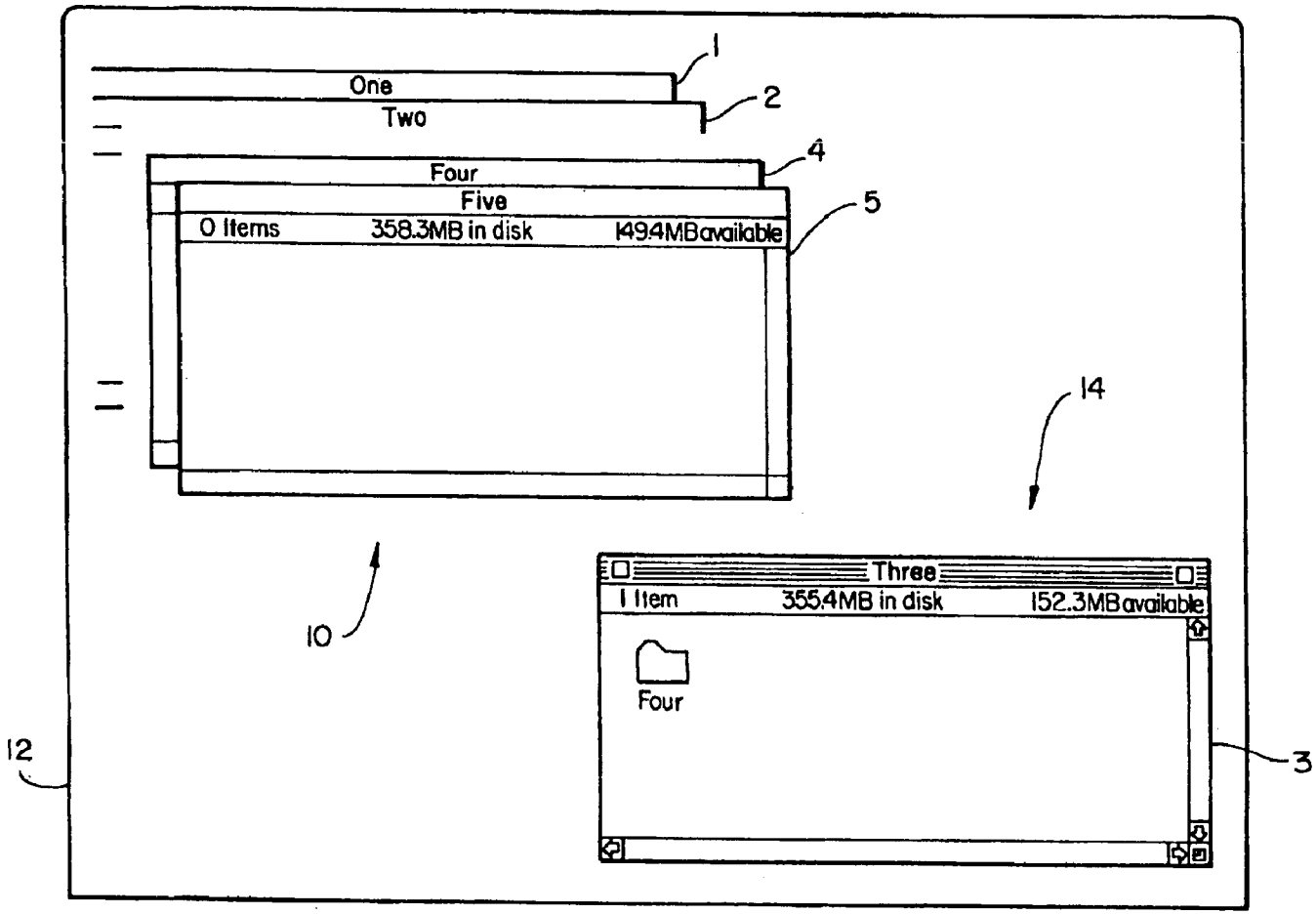
FIG 3 (Prior Art)
FIG. 3 shows the cascaded open windows of FIG. 2 lacking one of the windows which has been sprung open to a new location on the display space.

When a drag is initialized, a data structure is created which stores certain information relating to windows which are open in the display space at that point in time. Although the following text refers to this data structure as a "list", those skilled in the art will readily appreciate that any data structure capable of holding such information could be used for this purpose, e.g., a database, an array, etc. A list 60 used to capture information relating to the example provided in FIGS. 2 and 3 is illustrated as FIG. 6. Therein each of the folder windows 1–5 is identified in the list 60 using a "Window ID" field. Of course the actual numerical value of this field will vary depending upon the system implementation, but will suffice to identify the open window and its original location in display space 12. The order of the open windows can be established in the list 60 by, for example, listing these windows in front-to-back order. A location indicator is also associated with each open window to keep track of its current status, i.e., sprung or unsprung. Since folder windows 1–5 are all unsprung at the time of drag initialization, each of these indicators is set to a Boolean value indicating that they are unsprung, depicted as an "N" in FIG. 6.

When folder window 3 is sprung to the portion 14 of the display space illustrated in FIG. 3, the list 60 of FIG. 6 changes to reflect the springing of folder window 3 by changing the location indicator value to the Boolean value associated with a sprung, rather than an original, position e.g., the letter "Y" for FIG. 6. When the user ends the drag operation, and assuming that folder window 3 is to be closed in display space portion 14, folder window 3 will be returned to its original position among the cascaded, open windows 1,2, 4 and 5 using the information in the list 60 at that time. This operation can be performed as illustrated in the exemplary flowchart of FIG. 7.

Initially, the process begins by examining the window furthest to the back as rendered on the display space, e.g., WindowID 1 of list 60, at block 70. The WindowID of this window is compared, at decision block 72, with the WindowID of the window to be returned, in this case folder window 3. Until a match is found (block 72) or the end of the list is reached (block 74), the process iterates through each WindowID on the list from back to front by incrementing a list pointer after each set of decisions (at block 76) and branching back to the top of the loop. If the end of the list is reached without a match ("Yes" at block 74), then the process ends and the window to be returned is not redrawn in this portion of the display space. This can occur, for example, when a window which was not open at the time that the springing operation began is processed according to the present invention.

For the purposes of this example, however, a match will occur on the third iteration when the current WindowID has been incremented to three. Then the flow proceeds to block 78 where the next WindowID in the list 60 is examined to determine, at block 80, if folder window 4 has been sprung by checking the status of the location indicator field of list 60. In this example, as seen in FIG. 3, folder window 4 has not been sprung so the flow proceeds to block 82 where folder window 3 is redrawn behind window folder 4, i.e., such that the configuration seen in FIG. 2 is restored.

Figure 8:
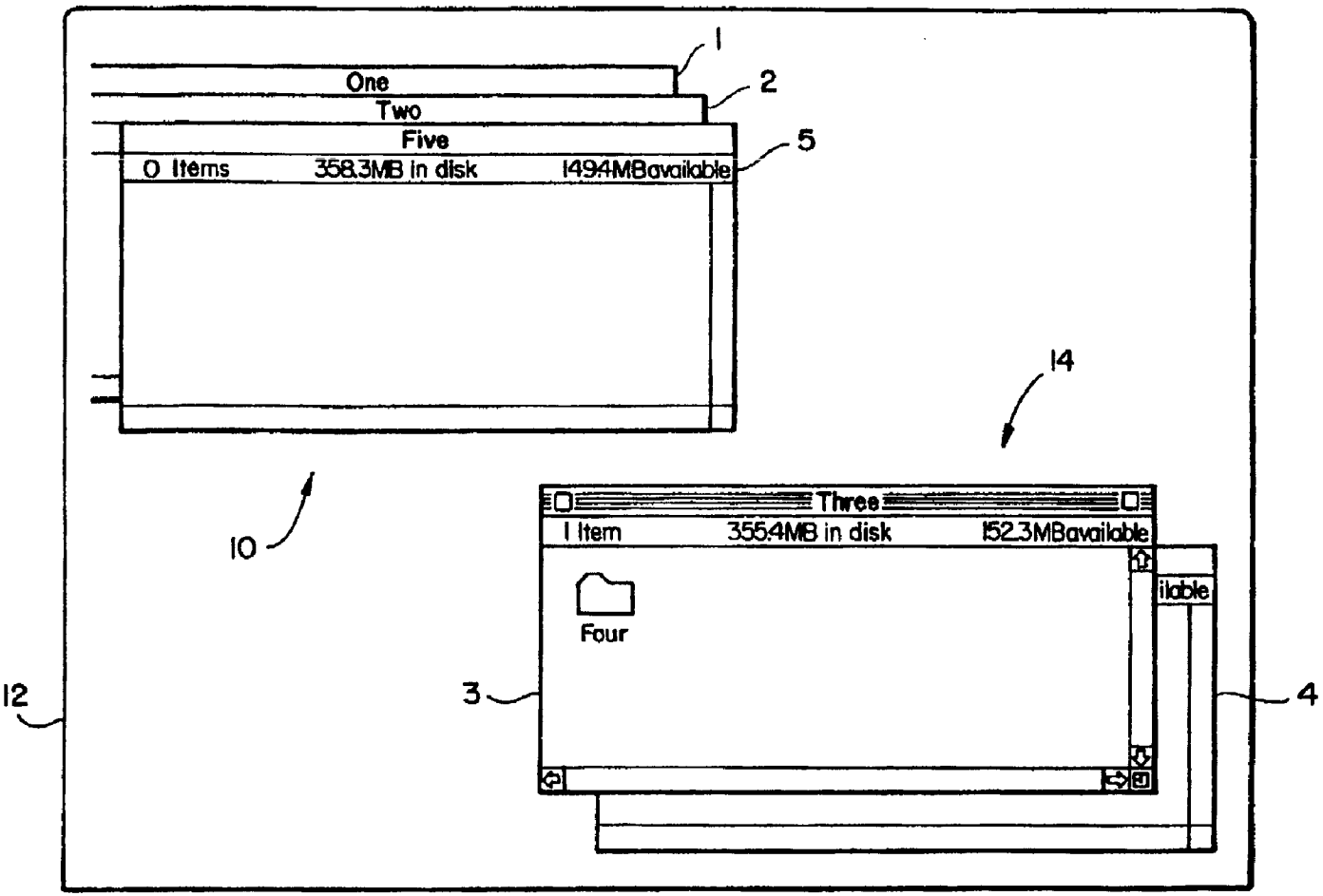
FIG. 8 illustrates another case wherein two windows are sprung from their original positions.

Consider now the case seen in FIG. 8. Therein, folder window 4 has also been sprung and is shown beneath the sprung version of folder window 3 in display space portion 14. Revisiting decision block 80 of FIG. 7, for the case depicted in FIG. 8, the flow would proceed via the "Yes" path to decision block 84 since folder window 4 has been sprung and is not in its original position in display space portion 10 as would be indicated by an appropriate location identifier value for WindowID 4 in list 60. If folder window 4 was at the end of the list 60, i.e., the frontmost window in the list, then the flow would proceed to block 86 where folder window three would be drawn as the frontmost window. However, this example includes window 5 in list 60 so the flow instead loops back to block 78 where window 5 is now examined. Since window 5 has not been sprung, window 3 is placed behind window 5 such that the window order from front to back in display space portion 10 will now be 5,3,2 and 1. Note that by determining whether a window has been sprung prior to returning another window, the situation is avoided where, for example, window folder 3 is redrawn behind folder window 4 in display space portion 14 rather than among the cascaded open windows in display space portion 10.

The above-described exemplary embodiments are intended to be illustrative in all respects, rather than restrictive, of the present invention. For example, the present invention is described herein by way of exemplary, illustrative embodiments, some of which refer to graphical user interfaces implemented using the Macintosh® computer system as a reference for explaining the present invention. However, those skilled in the art will readily appreciate that systems and methods according to the present invention can be applied to any type of display system having a user interface. Thus the present intention is capable of many variations in detailed implementation that can be derived from the description contained herein by a person skilled in the art. All such variations and modifications are considered to be within the scope and spirit of the present invention as defined by the following claims.

What is claimed is:

1. A method for returning a window to an original position among a plurality of cascaded windows which are rendered on a display space, comprising the steps of:

generating a list which provides a front-to-back order of said plurality of cascaded windows and an indicator of whether each of said plurality of cascaded windows is currently in its respective original, cascaded position;

*storing an initial location and position for a window;* removing said window from said original position;

rendering said window at another location on said display space;

receiving, at a graphical interface, an indication that said window is to be removed from said another location on said display space; and returning said window to said original position based upon said list generated by said step of generating.

2. The method of claim 1, wherein said step of returning further comprises the steps of:

comparing an identifier of said window with an identifier associated with each window in said list until a match occurs; and placing said window behind a window which is next in order in said list after said match occurs.

3. The method of claim 2, wherein said step of placing said window further comprises the step of:

placing said window behind said window which is next in order in said list after said match occurs only if said window is currently in its respective original, cascaded position.

4. A method for placing a first window behind a second window in a first portion of a display space, comprising the steps of:

generating a list which indicates that said first window is to be rendered behind said second window when both said first and said second windows are rendered in said first portion of said display space;

*storing an initial location and position for the first window;* removing said first window from behind said second window;

rendering said first window at a second portion of said display space;

removing said first open window from said second portion of said display space; and placing said first window behind said second window in said first portion of said display space by making reference to said list.

5. The method of claim 4, wherein a third window is disposed in front of both said second window and said first window when rendered in said first portion of said display space, said method further comprising the steps of:

removing said second window from said first portion of said display space;

rendering said second window in another portion of said display space; and placing said first window behind said third window in said first portion of said display space.

6. In a computer having a display, a system for returning a window object to its original location relative to at least one other window object, comprising:

a data structure for storing information associated with said window object and said at least one other window object including *an initial location of said window object and a* relative time-invariant order of said window object with respect to said at least one other window object;

a display on which said window object and said at least one other window object are rendered;

a graphical user interface for receiving and generating signals associated with said window object and said at least one other window object, including a signal indicating that said window object is to be returned to said original position; and a processor for receiving said signal and drawing said window object on said display at said original position using said information in said data structure.

7. The system of claim 6, wherein said data structure also include information indicating a position of said at least one other window object, and wherein said processor selectively draws said window object in an overlapping relationship with said other window object based upon said position indicating information in said data structure.

*8. A computer implemented method for maintaining an order of a plurality of windows on a display, each window having an initial location on the display and a position in the order of the plurality of windows, the method comprising the steps of:*

*storing the initial location and the position for each of the plurality of windows;*

*springing one of the windows from its initial location to a temporary location; and*

*removing the sprung window from its temporary location and displaying the sprung window in its stored initial location and position in the order of the plurality of windows.*

*9. The method of claim 8, wherein the order of the plurality of windows is a front-to-back order.*

*10. The method of claim 8, wherein springing the window further comprises removing the window from its initial location.*

*11. The method of claim 8, wherein the window sprung to the temporary location is brought to a front position in the order of the plurality of windows when sprung.*

*12. The method of claim 11, wherein the sprung window is displayed in an original position in the order when the sprung window is displayed in its initial location.*

*13. The method of claim 8, wherein springing of the one of the windows is in response to a user action.*

*14. The method of claim 13, wherein the user action comprises placing an item over an icon on the display associated with the window that is sprung.*

*15. A system for maintaining an order of a plurality of windows on a display when one of the plurality of windows is temporarily sprung to a temporary location on the display, the system comprising:*

*a data structure for storing for each of the plurality of windows, an initial location on the display and a position in the order of the plurality of windows;*

*a graphical user interface in which each window is displayed in its initial location, and for receiving an input from a user associated with a springing operation; and*

*computer program logic coupled to the data structure and to the user interface, for displaying each of the plurality of windows on the display, the computer program logic adapted to spring one of the windows to a temporary location on the display in response to the user action, and adapted to remove the sprung window from its temporary location, and display the sprung window in its initial location and position according to the data structure.*

*16. The system of claim 15, wherein the user action resulting in a springing operation is placing an item over an icon on the display associated with the window that is sprung.*

*17. The system of claim 15, wherein the order of the plurality of windows is a front-to-back order.*

*18. The system of claim 15, wherein the computer program logic removes the window from its initial location when springing the window to its temporary location.*

*19. The system of claim 15, wherein computer program logic displays the sprung window in a front position in the order of the windows.*

*20. The system of claim 15, wherein computer program logic displays the sprung window in an original position in the order when it displays the sprung window in its initial location.*

*21. The system of claim 15, wherein the user action comprises placing an item over an icon on the display associated with the window that is sprung.*

*22. A computer implemented method for maintaining an order of a plurality of windows on a display, each window having an initial location on the display and a position in the order of the plurality of windows, the method comprising the steps of:*

*responsive to detecting a user's interest in one of the windows:*

*storing an initial location and position for the window; and*

*moving the window from its initial location to a temporary location; and*

*responsive to detecting the end of the user's interest in the window, removing the window from its temporary location and displaying the window in its initial location and position in the order of the plurality of windows.*

*23. The method of claim 22, wherein detecting a user's interest in one of the windows comprises detecting user input in connection with the window.*

*24. The method of claim 22, wherein detecting a user's interest in one of the windows comprises detecting a cursor being held over the window, and wherein detecting the end of the user's interest in the window comprises detecting a cursor not being held over the window.*

*25. The method of claim 22, wherein detecting a user's interest in one of the windows comprises detecting an activation command within the window, and wherein detecting the end of the user's interest in the window comprises detecting an activation command outside the window.*

*26. The method of claim 25, wherein each activation command comprises a mouse click.*

*27. The method of claim 22, wherein detecting a user's interest in one of the windows comprises detecting placement of an item over an icon associated with the window.*

*28. The method of claim 22, wherein the order of the plurality of windows is a front-to-back order.*

*29. The method of claim 28, wherein moving the window further comprises removing the window from its initial location.*

*30. The method of claim 28, wherein moving the window further comprises bringing the window to a front position in the order of the plurality of windows.*

*31. A system for maintaining an order of a plurality of windows on a display, each window having an initial location on the display and a position in the order of the plurality of windows, the system comprising the steps of:*

*an output device for displaying the plurality of windows;*

*an input device for detecting a user's interest in one of the windows;*

*computer program logic coupled to the input device, for:*

*responsive to the input device detecting a user's interest in one of the windows;*

*storing an initial location and position for the window; and*

*causing the output device to move the window from its initial location to a temporary location; and*

*responsive to the input device detecting the end of the user's interest in the window, causing the output device to remove the window from its temporary location and to display the window in its initial location and position in the order of the plurality of windows.*

*32. The system of claim 31, wherein detecting a user's interest in one of the windows comprises detecting user input in connection with the window.*

*33. The system of claim 31, wherein the input device detects a user's interest in one of the windows by detecting a cursor being held over the window, and wherein the input device detects the end of the user's interest in the window by detecting a cursor not being held over the window.*

*34. The system of claim 31, wherein the input device detects a user's interest in one of the windows by detecting an activation command within the window, and wherein the input device detects the end of the user's interest in the window by detecting an activation command outside the window.*

*35. The system of claim 34, wherein each activation command comprises a mouse click.*

*36. The system of claim 31, wherein the input device detects a user's interest in one of the windows by detecting placement of an item over an icon associated with the window.*

*37. The system of claim 31, wherein the order of the plurality of windows is a front-to-back order.*

*38. The system of claim 37, wherein the computer program logic further causes the output device to remove the window from its initial location.*

*39. The system of claim 37, wherein the computer program logic further causes the output device to bring the window to a front position in the order of the plurality of windows.*

*40. A computer program product for maintaining an order of a plurality of windows on a display, each window having an initial location on the display and a position in the order of the plurality of windows, the computer program product comprising:*

*a computer-readable medium; and*

*computer program code, encoded on the medium, for:*

*storing the initial location and the position for each of the plurality of windows;*

*springing one of the windows from its initial location to a temporary location; and*

*removing the sprung window from its temporary location and displaying the sprung window in its stored initial location and position in the order of the plurality of windows.*

*41. The computer program product of claim 40, wherein the order of the plurality of windows in a front-to-back order.*

*42. The computer program product of claim 40, wherein the computer program code for springing the window further comprises computer program code for removing the window from its initial location.*

*43. The computer program product of claim 40, wherein the window sprung to the temporary location is brought to a front position in the order of the plurality of windows when sprung.*

*44. The computer program product of claim 43, wherein the sprung window is displayed in an original position in the order when the sprung window is displayed in its initial location.*

*45. The computer program product of claim 40, wherein the computer program code for springing of the one of the windows operates in response to a user action.*

*46. The computer program product of claim 45, wherein the user action comprises placing an item over an icon on the display associated with the window that is sprung.*

*47. A computer program product for maintaining an order of a plurality of windows on a display, each window having an initial location on the display and a position in the order of the plurality of windows, the computer program product comprising:*

*a computer-readable medium; and*

*computer program code, encoded on the medium, for:*

*responsive to detecting a user's interest in one of the windows:*

*storing an initial location and position for the window; and*

*moving the window from its initial location to a temporary location; and*

*responsive to detecting the end of the user's interest in the window, removing the window from its temporary location and displaying the window in its initial location and position in the order of the plurality of windows.*

*48. The computer program product of claim 47, wherein the computer program code for detecting a user's interest in one of the windows comprises computer program code for detecting user input in connection with the window.*

*49. The computer program product of claim 47, wherein the computer program code for detecting a user's interest in one of the windows comprises computer program code for detecting a cursor being held over the window, and wherein the computer program code for detecting the end of the user's interest in the window comprises computer program code for detecting a cursor not being held over the window.*

*50. The computer program product of claim 47, wherein the computer program code for detecting a user's interest in one of the windows comprises computer program code for detecting an activation command within the window, and wherein the computer program code for detecting the end of the user's interest in the window comprises computer program code for detecting an activation command outside the window.*

*51. The computer program product of claim 50, wherein each activation command comprises a mouse click.*

*52. The computer program product of claim 47, wherein the computer program code for detecting a user's interest in one of the windows comprises computer program code for detecting placement of an item over an icon associated with the window.*

*53. The computer program product of claim 47, wherein the order of the plurality of windows is a front-to-back order.*

*54. The computer program product of claim 53, wherein the computer program code for moving the window further comprises computer program code for removing the window from its initial location.*

*55. The computer program product of claim 53, wherein the computer program code for moving the window further comprises computer program code for bringing the window to a front position in the order of the plurality of windows.*

* * * * *